M. MACMILLAN.
MILK CAN.
APPLICATION FILED AUG. 16, 1912. RENEWED APR. 27, 1916.
1,207,963.
Patented Dec. 12, 1916.
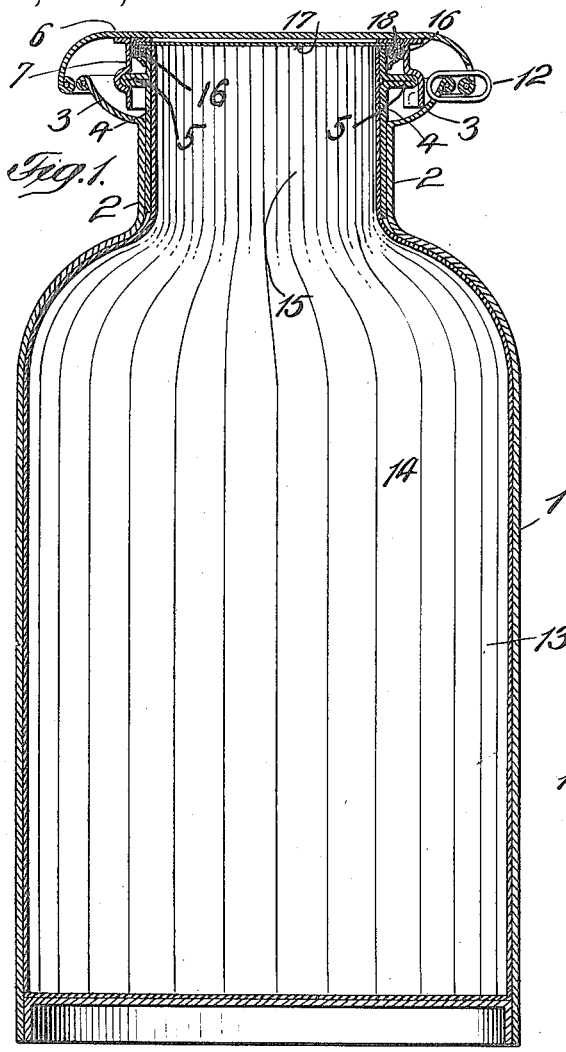
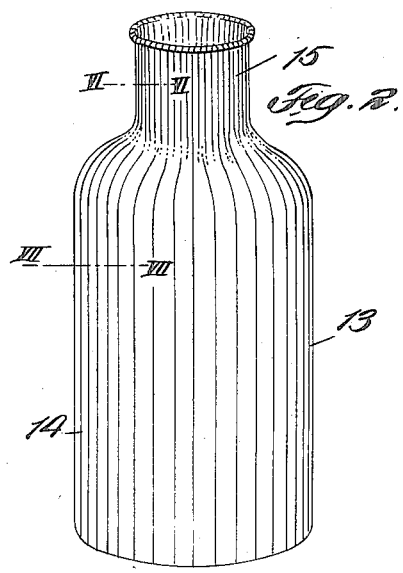
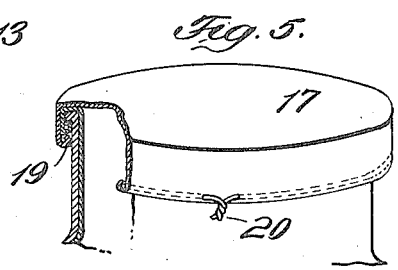
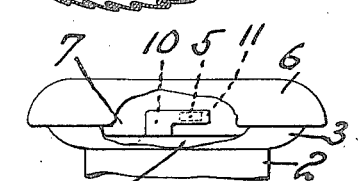
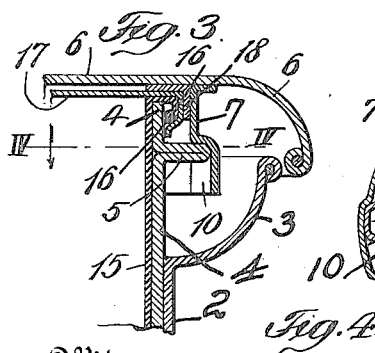
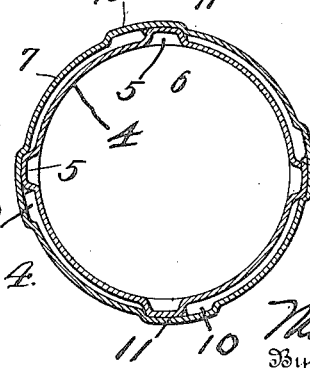
Witnesses:
Inventor
Marion Macmillan
By her Attorneys

UNITED STATES PATENT OFFICE.

MARION MACMILLAN, OF NEW YORK, N. Y.

MILK-CAN.

1,207,963. Specification of Letters Patent. Patented Dec. 12, 1916.

Application filed August 16, 1912, Serial No. 715,354. Renewed April 27, 1916. Serial No. 94,047.

*To all whom it may concern:*

Be it known that I, MARION MACMILLAN, a subject of the King of Great Britain, and resident of the borough of Manhattan, city, county, and State of New York, have invented certain new and useful Improvements in Milk-Cans, of which the following is a specification.

The main object of this invention is to provide a moisture-proof, removable lining for milk cans.

It is extremely difficult to thoroughly clean the interior of cans used for transportation of milk. It seems to be practically impossible to remove all the traces of the milk from the interior of the cans, particularly from the corners and the joints and it is the object of my invention to provide means whereby the milk will not come in contact with the interior of the can but will be held in a moisture-proof, removable container or lining which, after the can is emptied, may be bodily withdrawn from the can and destroyed. It is manifest that this will leave the can perfectly clean and absolutely dry.

Another object of the invention is to provide such a lining for a can in proper form to be readily inserted through the top or mouth of the can and then expanded by the weight or pressure of the milk as it is poured into the can.

Another object of the invention is to provide a one-piece seamless, moisture-proof lining for a milk can, said lining being plaited to shape it substantially to the form of the interior of the can and at the same time to make said lining extensible or expansible and flexible so that it may be readily folded or otherwise temporarily reduced in diameter for insertion through the neck of the can.

Another object of the invention is to provide means whereby the can lining may be closed and sealed after the milk can has been filled so that the milk will be contained within a sealed inner container which will be protected by the outer metal can. The can will be provided with a suitable metal cover which will serve as a protector for the lining closure.

In the drawings, Figure 1 is a longitudinal vertical sectional view of a milk can showing my lining therein; Fig. 2 a perspective view of the lining removed from the can; Fig. 3 a detail vertical sectional view of the upper end of the can showing the cover in place; Fig. 4 a horizontal sectional view of the interlocking parts of the cover and the neck of the can taken on the line IV—IV of Fig. 3; Fig. 5 a detail perspective view partly in section of one form of means for sealing the lining across the neck of the can; Fig. 6 a transverse sectional view of the lining on the line VI—VI of Fig. 2; Fig. 7 a similar view on the line VII—VII of Fig. 2; and Fig. 8 a detail side elevation of the top of the can, portions being broken away to show the interlocking connections between the cover and the neck.

Referring to the various parts by numerals, 1 designates a milk can which may be of any suitable construction and of any suitable size and form. The main body of the can is formed with the contracted throat 2 at its upper end. At the upper end of this throat is formed the outwardly and upwardly extending annular flange 3. Within the throat is rigidly secured an upwardly extending tubular neck 4, said neck extending slightly above the flange 3. The neck 4 above the throat 2 is provided with a series of outwardly extending lugs 5 preferably formed by bending outwardly the metal of the neck as shown clearly in the drawings. It will, of course, be understood that there may be as many of these lugs used as may be found necessary or desirable. The cover 6 is provided with the downwardly extending annular flange 7 which is formed on its inner side with the vertical grooves 10 which are adapted to receive the lugs 5 on the neck. Connected to these vertical grooves 10 are substantially horizontal grooves 11 which extend slightly upwardly from said grooves 10. It is manifest that by placing the cover 6 down over the neck and bringing the vertical grooves 10 into register with the lugs 5 the lugs readily enter said grooves and permit the cover to be forced into place over the neck. When the cover is properly in position it may be slightly rotated to cause the lugs 5 to enter the grooves 11, the walls of which, by reason of their inclination, will force or draw the cover downwardly. The cover extends out beyond the upper edge of the flange 3 and slightly below the same so as to form a complete protection therefor and to prevent dirt and water or moisture lodging in said flange 3. The cover is loosely connected to the flange 3 by means of a link 12 so that the cover is permanently but loosely connected to the can. This link is large enough to permit of the partial rotation of the cover 6 for interlocking the lugs 5 in the grooves 11, and also to permit the cover to be bodily removed from the neck.

I form my can lining 13 of any suitable yielding, flexible, moisture-proof material such as waxed or paraffin paper of a suitable thickness and strength. I prefer to shape the lining to fit the interior of the can, as shown clearly in Figs. 1 and 2. The lining is preferably formed of a single piece of material fluted or plaited as at 14 to form a cylindrical vessel or receptacle of the same diameter as the interior of the can. The upper end of this cylindrical receptacle is contracted to form the neck 15 by closely plaiting it. The relative sizes and numbers of the plaits in the body of the lining and in the neck thereof are shown in Figs. 6 and 7. The upper end of the neck portion of the lining or receptacle is turned outwardly and around a strengthening and retaining wire 16, said wire being adapted to rest upon the outer surface of the neck 4, as shown clearly in Fig. 3. This enables the lining to be folded over the upper edge of the neck 4 of the can. The lining thus formed will be seamless and its body part may be folded sufficiently to permit it to be passed into the can through the neck thereof. It will be flexible so that it will readily expand to fit the interior of the can. If the lining as formed and in its normal size does not closely fit the interior of the can the weight of the milk or other contents of the can will readily expand it so that it will be closely supported by the rigid can body. The plaiting necessary to contract the upper portion sufficiently to form the neck 15 thereof will greatly strengthen that portion of the lining and thereby adapt it to stand the extra wear which it must stand at that point.

To seal the lining a cap 17 is placed across the neck of the can, said cap extending outside of the ring 16 of the lining, as shown clearly in Figs. 1 and 3. The cap 17 is formed of any suitable flexible water-proof material similar to the material of which the lining is formed. To securely hold the cap 17 in place an angle compression ring 18 is placed around the edge thereof, as shown clearly in Figs. 1 and 3, the upper horizontal member of this angle ring being forced down on the cap 17 and the overturned edge of the lining 15 by means of the cover 6. As the said cover is turned to force the lugs 5 into the grooves 11 said cover is drawn downwardly to the clamping ring 18 and the said ring is by the cover forced downwardly on the cap 17 and the lining, as described. The cover 6 forms a complete protection for the cap 17 and as a clamping means for holding the clamping ring and said cap in position.

The cap 17 may be provided around its lower edge with a sealing wire 19, as shown in Fig. 5, the ends of this wire being brought together and twisted to interlock them as shown at 20 in said figure. By thus twisting together the two ends of the sealing wire the cap is locked under the wire of the lining and cannot be readily detached without first breaking the seal at 20. This is important for the reason that it prevents the theft of milk or cream during the transportation of the cans.

It will, of course, be understood that the lining may be formed of any suitable material and that it may be shaped or formed to fit the interior of the can or be so constructed that the weight of the milk will expand it in the can. It is also manifest that any suitable sealing means may be employed. The lining forms a complete receptacle which is strengthened and stiffened about the neck by reason of the fact that it is closely plaited or fluted.

What I claim is:

1. A can lining formed of a single piece of flexible, water-proof material plaited or fluted to form a cylindrical seamless vessel adapted to expand under a suitable pressure, the upper end of said lining being plaited to form a contracted neck, and an annular binding wire secured to the upper end of said contracted portion.

2. A can comprising a rigid body formed with an upstanding contracted throat, an outwardly and upwardly extending annular flange connected to the upper end of said throat, a tubular neck projecting upwardly from the throat, a cover carrying a downwardly extending annular flange adapted to receive the throat when the cover is in position, means for interlocking said flange with said neck, means for loosely connecting the cover to the upwardly extending flange of the throat, and a seal for the upper end of the neck adapted to be held securely in position by the cover.

3. A can comprising a rigid body formed with an upstanding contracted throat, an outwardly and upwardly extending annular flange connected to the upper end of said throat, a tubular neck projecting upwardly from the throat, a cover, a downwardly extending annular flange secured to the under side of the cover and fitting outside of the neck, outwardly extending lugs formed on the neck, means carried by the cover for interlocking the cover with said lugs, a seal for the upper end of the neck, and an annular sealing band around the edge of said seal, said seal and band being held in position by the cover.

4. A can comprising a rigid body formed with an upstanding contracted throat, an outwardly and upwardly extending annular flange connected to the upper end of said throat, a tubular neck projecting upwardly from the throat, a cover carrying a downwardly extending annular flange adapted to receive the neck when the cover is in position, means for interlocking said flange with said neck, and a seal for the upper end of the neck adapted to be held securely in position by the cover.

5. A can comprising a rigid body formed with an upstanding contracted throat, a tubular neck projecting upwardly from the throat, a cover, a downwardly extending annular flange secured to the under side of the cover and fitting outside of the neck, outwardly extending lugs formed on the neck, means carried by the cover for detachably interlocking the cover with said lugs, a seal for the upper end of the neck, and an annular sealing band around the edge of the said seal, said seal and band being held in position by the cover.

6. A can comprising a rigid body formed with an upstanding contracted throat, an outwardly and upwardly extending annular flange connected to the upper end of said throat, a tubular neck projecting upwardly from the throat, a cover curving downwardly around its edge to cover and inclose the upwardly extending flange at the upper end of the throat, a downwardly extending annular flange carried by the cover and adapted to receive the neck when the cover is in position, means for interlocking said flange with said neck, and a seal for the upper end of the neck adapted to be held securely in position by the cover.

In testimony whereof I hereunto affix my signature in the presence of two witnesses.

MARION MACMILLAN.

Witnesses:
LILLIAN McGUIRE,
F. R. MILLER.